US012208930B1

(12) United States Patent
Cunningham et al.

(10) Patent No.: US 12,208,930 B1
(45) Date of Patent: Jan. 28, 2025

(54) 5G-CONNECTED DRONE ROUTING SYSTEM CAPABLE OF MONITORING INTERIOR ENVIRONMENTS

(71) Applicant: T-Mobile USA, Inc., Bellevue, WA (US)

(72) Inventors: Timothy E. Cunningham, Dedham, MA (US); Matthew Mathias, Richmond, RI (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/499,594

(22) Filed: Nov. 1, 2023

(51) Int. Cl.
*B64U 20/83* (2023.01)
*G08G 5/00* (2006.01)

(52) U.S. Cl.
CPC .......... *B64U 20/83* (2023.01); *G08G 5/0069* (2013.01); *B64U 2201/10* (2023.01)

(58) Field of Classification Search
CPC ............... B64U 20/83; B64U 2201/10; B64U 2201/104; B64U 2201/20; G08G 5/0069; G08G 5/003; G08G 5/0034; G08G 5/0039; G08G 5/006; G05D 1/0088; G05D 1/02; G05D 1/0011; G05D 1/0016; B64C 39/024
See application file for complete search history.

(56) References Cited

U.S. PATENT DOCUMENTS

| | | | |
|---|---|---|---|
| 9,479,392 B2 | 10/2016 | Anderson et al. | |
| 9,864,372 B2 | 1/2018 | Chen et al. | |
| 9,927,807 B1 * | 3/2018 | Ganjoo | ................ G08G 5/0082 |
| 10,185,316 B2 | 1/2019 | Kablaoui | |
| 10,234,862 B2 | 3/2019 | Teague | |
| 10,303,167 B2 | 5/2019 | Chen et al. | |
| 10,567,917 B2 | 2/2020 | Cantrell et al. | |
| 10,579,059 B2 | 3/2020 | Cantrell et al. | |
| 10,642,264 B2 | 5/2020 | Sentosa et al. | |
| 10,679,509 B1 * | 6/2020 | Yarlagadda | .......... G08G 5/0039 |
| 10,712,743 B2 * | 7/2020 | Hall | ..................... G08G 5/0021 |

(Continued)

FOREIGN PATENT DOCUMENTS

DE 102019129062 A1 4/2020
DE 102021117852 A1 1/2022

(Continued)

*Primary Examiner* — Benjamin P Lee
(74) *Attorney, Agent, or Firm* — Perkins Coie LLP (57) ABSTRACT

A system pairs a 5G-connected drone to a 5G-enabled user-controlled device. The system sets a predicted route for the 5G-connected drone to navigate. A portion of this route is indoors and matches an actual route of the user-controlled device. The system then causes the 5G-connected drone to commence navigating the predicted route. The system receives environmental data from the area surrounding the 5G-connected drone on the predicted route measured by a set of onboard sensors of the 5G-connected drone. Using the received environmental data and a deviation of the predicted route from the actual route traversed by the user-controlled device, the system determines that an alternate route for the 5G-connected drone exists and sets the alternate route. The system generates a notification based on the environmental data indicating hazards on the alternate route and transmits the notification over a 5G network to the user-controlled device.

20 Claims, 7 Drawing Sheets

(56) References Cited

U.S. PATENT DOCUMENTS

| | | |
|---|---|---|
| 10,777,051 B1 | 9/2020 | Kumar et al. |
| 10,977,952 B2 | 4/2021 | Shaw et al. |
| 11,074,540 B2 | 7/2021 | Sweeney et al. |
| 11,183,071 B2 | 11/2021 | Delaney et al. |
| 11,215,986 B2 | 1/2022 | Chen et al. |
| 11,258,625 B2 | 2/2022 | Decenzo et al. |
| 11,263,909 B2 | 3/2022 | Priest |
| 11,288,936 B1 | 3/2022 | Kumar et al. |
| 11,635,775 B2 * | 4/2023 | Wang .................. G06T 7/70 |
| | | 701/3 |
| 11,792,036 B2 | 10/2023 | Decenzo et al. |
| 11,995,999 B2 * | 5/2024 | Madden ............... G08G 5/0056 |
| 2017/0308085 A1 * | 10/2017 | Hall ..................... G08G 5/0013 |
| 2019/0011921 A1 * | 1/2019 | Wang ................... H04N 23/695 |
| 2019/0101934 A1 * | 4/2019 | Tuukkanen ........ G01C 21/3691 |
| 2019/0235489 A1 | 8/2019 | Cantrell et al. |
| 2020/0072613 A1 * | 3/2020 | Kuzmanovic ........... G06T 17/05 |
| 2021/0116943 A1 * | 4/2021 | Wang ....................... G06T 7/70 |
| 2021/0122467 A1 * | 4/2021 | Rezvani ................. B64U 80/25 |
| 2021/0132625 A1 | 5/2021 | Gillett |
| 2021/0390867 A1 | 12/2021 | Kim et al. |
| 2022/0051577 A1 * | 2/2022 | Ali ........................ G08G 5/0091 |
| 2022/0169401 A1 * | 6/2022 | Di Cosola ............... B60L 53/12 |
| 2022/0340274 A1 * | 10/2022 | Motahar ................. B64C 39/024 |
| 2022/0351607 A1 * | 11/2022 | Bart .................... G08B 13/1965 |
| 2023/0016836 A1 * | 1/2023 | Pottle .................... G01S 19/08 |
| 2023/0071981 A1 | 3/2023 | Shapira et al. |
| 2023/0147814 A1 * | 5/2023 | Carver ................. G08G 5/0091 |
| | | 701/3 |
| 2023/0408288 A1 * | 12/2023 | White .................. G08G 5/0086 |
| 2024/0133693 A1 * | 4/2024 | Ali ........................ G08G 5/0069 |
| 2024/0152159 A1 * | 5/2024 | Kahn ..................... G05D 1/101 |
| 2024/0153392 A1 * | 5/2024 | Baer ..................... G08G 5/0013 |

FOREIGN PATENT DOCUMENTS

| | | | |
|---|---|---|---|
| EP | 3268278 A1 | 1/2018 | |
| EP | 3287748 B1 | 3/2020 | |
| EP | 3481653 B1 | 4/2020 | |
| EP | 3759561 A1 | 1/2021 | |
| EP | 3619695 B1 | 7/2021 | |
| EP | 3619590 B1 | 9/2021 | |
| EP | 3965414 B1 | 2/2023 | |
| EP | 3797342 B1 | 6/2023 | |
| EP | 3680648 B1 | 7/2023 | |
| WO | 2016145411 A1 | 9/2016 | |
| WO | 2018013234 A1 | 1/2018 | |
| WO | 2018204807 A1 | 11/2018 | |
| WO | 2019028356 A1 | 2/2019 | |
| WO | 2019152693 A2 | 8/2019 | |
| WO | 2019168793 A1 | 9/2019 | |
| WO | 2019168856 A1 | 9/2019 | |
| WO | WO-2019168410 A1 * | 9/2019 | ............ G01S 13/60 |
| WO | 2020103024 A1 | 5/2020 | |
| WO | 2020105898 A1 | 5/2020 | |
| WO | WO-2023285959 A1 * | 1/2023 | ........... G05D 1/0094 |

* cited by examiner

5G-CONNECTED DRONE ROUTING SYSTEM CAPABLE OF MONITORING INTERIOR ENVIRONMENTS

BACKGROUND

A drone is an aircraft without any human pilot, crew, or passengers on board. Businesses and the public sector have leveraged drones in numerous ways, including supporting search and rescue missions, facilitating infrastructure inspections, delivering medical supplies, and improving access to healthcare in remote communities. The drones most commonly seen in daily life are quadcopters. These drones have four propellers, a small size, and low inertia, allowing the use of a particularly simple flight control system, which has greatly increased the practicality of the small quadrotor in this application. The four-rotor design allows the drones to be relatively simple in design yet highly reliable and maneuverable. When flying, drones typically use less-reliable signals such as point-to-point links or Wi-Fi, which are signals that could be lost at any time during flight. These signals are inherently limited in range, and when flying in areas with other Wi-Fi networks or point-to-point links, the signal quality may be degraded. This decreases the range even further or causes poor video quality.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Frontline workers need situational awareness before entering a structure or remote location, allowing them to know of any potential hazards and exposure to harmful diseases. The disclosed technology relates to a system that includes a 5G-connected indoor drone that safely enters a location and conveys audio, video, air quality, and/or thermal information to a waiting frontline worker, allowing the system to assess the situation before the frontline worker enters the premises. Using the fifth generation wireless network or 5G network gives a more reliable connection with lower latency compared to previous generation wireless networks, point-to-point links, and Wi-Fi, allowing the drone to be flown by a remote pilot, for example. The 5G network allows the 5G-connected drone to operate in locations where Wi-Fi is unavailable or where an obstructed point-to-point link exists. Additionally, the 5G network enables maintenance such as firmware upgrades, virus scans, or battery status checks to be remotely performed on the 5G-connected drone anywhere the 5G-connected drone is connected to the 5G network. As more data is collected, the drone can gain more autonomous functionality, reducing the need for a remote pilot.

The disclosed technology pairs a 5G-connected drone to a user-controlled device such as a smartphone or a tablet device. The 5G-connected drone can also connect to multiple user-controlled devices. For example, the multiple user-controlled devices can be networked in parallel or sequentially for continuity or supervisory control. Multiple 5G-connected drones can also be connected to the user-controlled device. The 5G-connected drone can be operated by multiple remote pilots, and the remote pilots can be located in a contact center.

Once paired, the 5G-connected drone sets a predicted route to navigate based on the route for which the user-controlled device will travel. The predicted route is at least partially indoors. The 5G-connected drone then travels the predicted route. While navigating the predicted route, the 5G-connected drone uses a multitude of sensors to measure a stream of environmental data taken in from its surroundings along the predicted route.

Based on the collected environmental data and any deviations of the user-controlled device from the predicted route, the 5G-connected drone can anticipate any hazards along the predicted route, verify that such hazards exist, and determine whether an alternate route is justified. If so, the 5G-connected drone will begin following the alternate route. A notification is then generated notifying the user-controlled device of the hazard that is expected to be present along the actual route taken by the user-controlled device. The notification can be transmitted to the user-controlled device with a continuous stream of environmental data over the 5G network.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
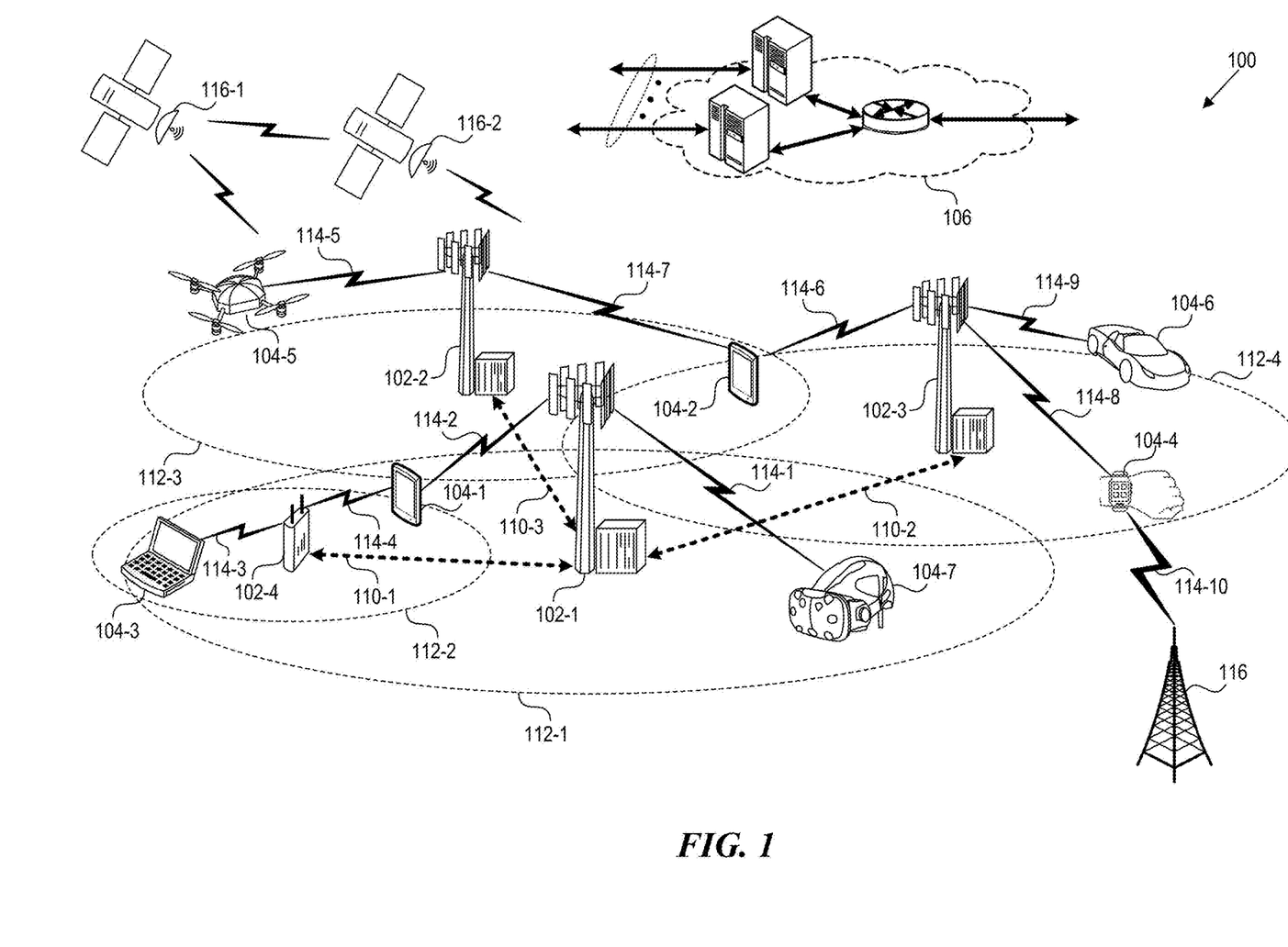
FIG. 1 is a block diagram that illustrates a wireless communications system that can implement aspects of the present technology.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
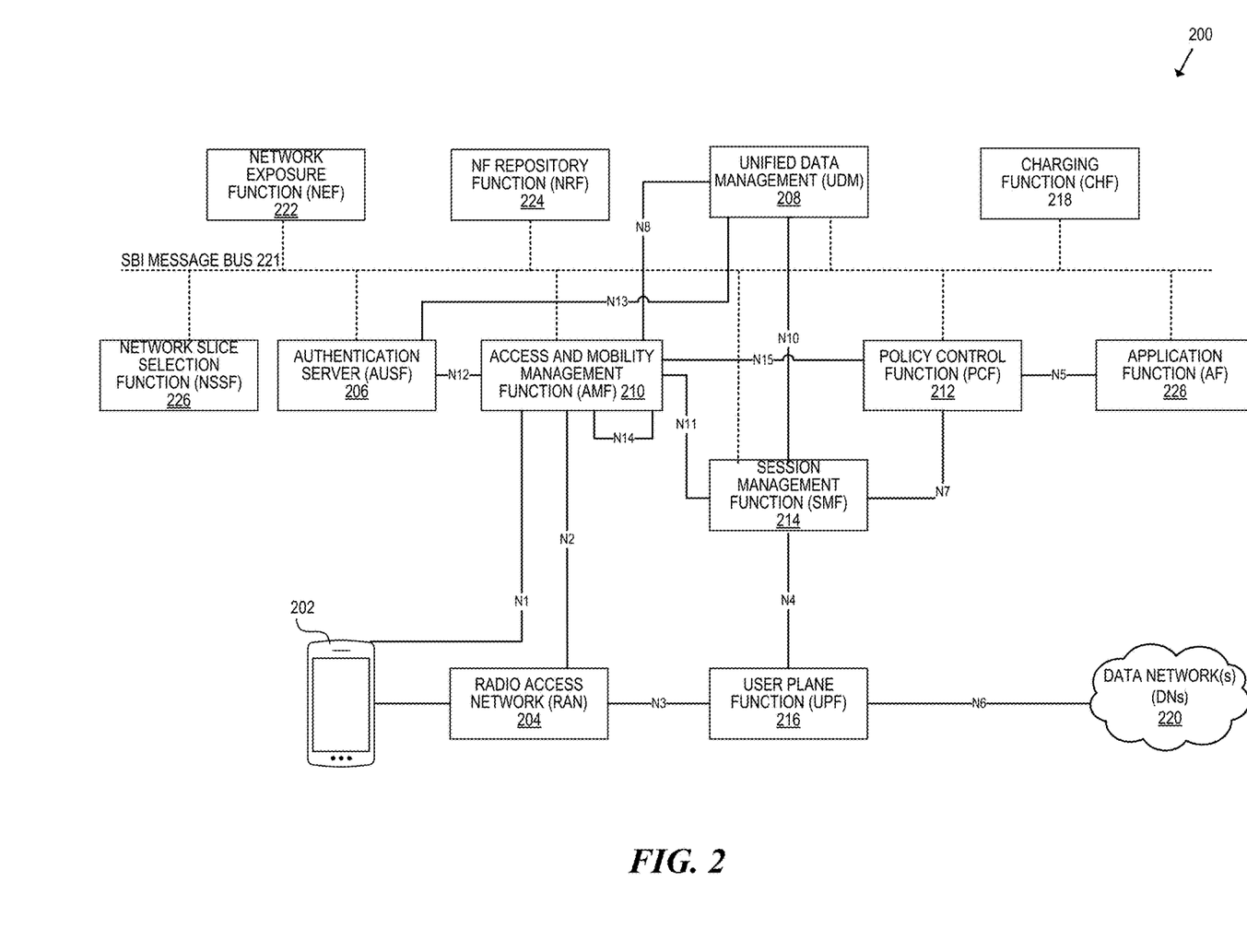
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (Afs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

5G-Connected Drone System

Figure 3A:
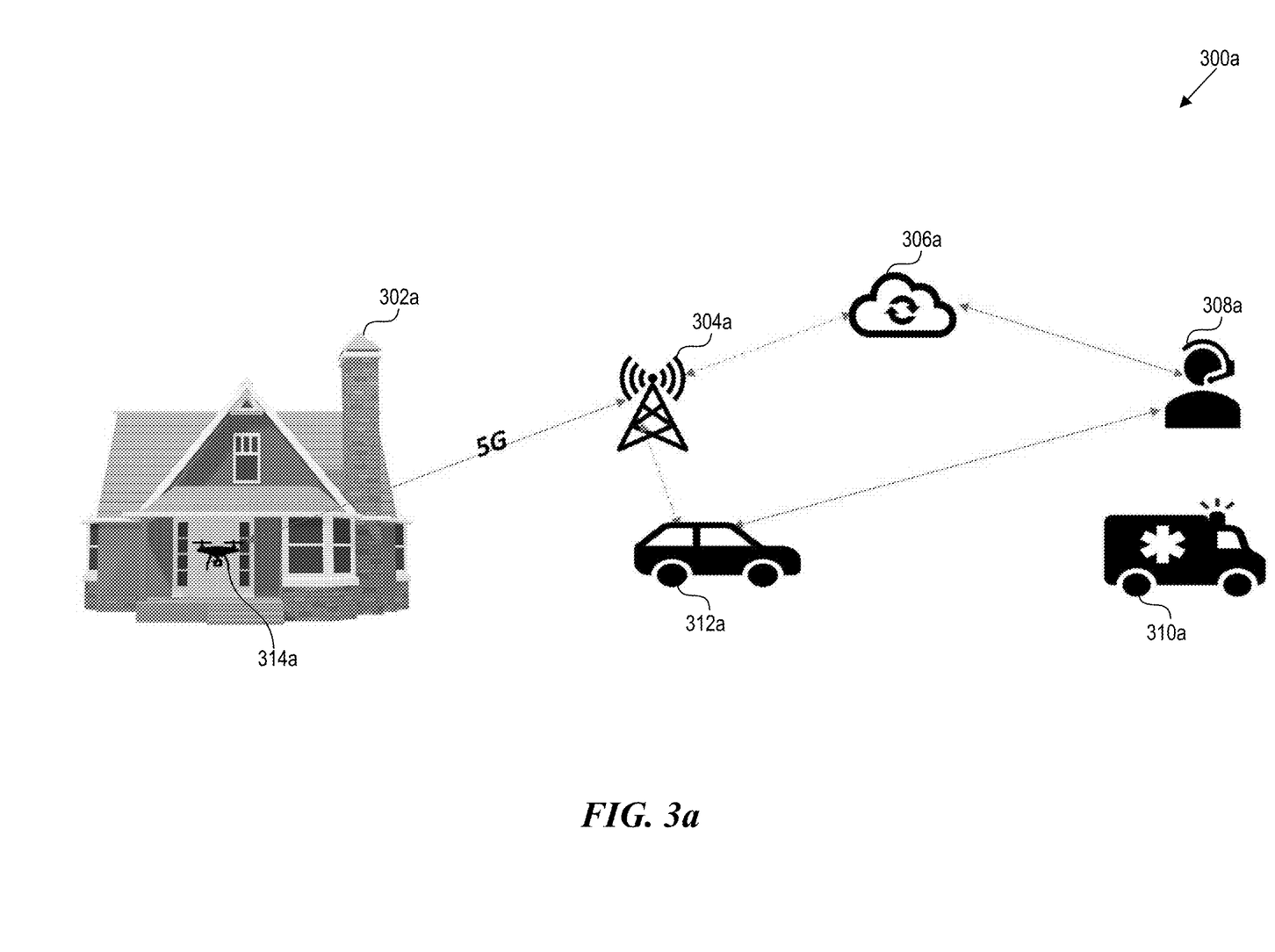
FIGS. 3a-3c are block diagrams that illustrate use cases of the disclosed technology in which the system navigates a 5G-connected drone in the interior of or outside of different structure types.

FIG. 3a is a block diagram that illustrates an example use case of the disclosed technology in which the system is operated inside and around a single-family home 302a. The 5G-connected drone 314a arrives at the location via a vehicle 312a. The 5G-connected drone 314a is a small unmanned aerial system capable of carrying a payload. The vehicle 312a is any vehicle or mode of transport that can transport the 5G-connected drone 314a to the required flight location. Once the 5G-connected drone 314a arrives at the desired location, it connects to a 5G network 304a. This allows the drone to connect to the cloud 306a, through which it can then receive flight control instructions. In one example, the system 300a sends the alternate route to a remote pilot 308a. The remote pilot 308a determines the needed flight control instructions and transmits them via the cloud 306a and 5G network 304a to the system 300a. The system 300a receives the flight control instructions and sends the flight control instructions to the 5G-connected drone 314a over the 5G network 304a. The system then causes the 5G-connected drone 314a to fly in accordance with the sequence of flight control instructions.

In another example, the flight control instructions are generated automatically using a machine learning model, which also regularly updates the flight control instructions to ensure the 5G-connected drone flies properly. The model determines the sequence of flight controls based on the alternate route and received environmental data. For example, the environmental data can include sound, visual temperature, and/or air quality data and be collected using a microphone, camera, thermal sensor, and/or air sensor. The system 300a sends the sequence of flight control instructions to the 5G-connected drone 314a and causes the 5G-connected drone 314a to fly in accordance with the sequence of flight control instructions. A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, a drone flight model is associated with a neural network with multiple input nodes that receive environmental data. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer ("the output layer"), one or more nodes can produce a value classifying the input that, once the model is trained, can be used as a data point in determining the proper flight control instructions. In some implementations, such neural networks, known as deep neural networks, can have multiple layers of intermediate nodes with different configurations, can be a combination of models that receive different parts of the input and/or input from other parts of the deep neural network, or are convolutions-partially using output from previous iterations of applying the model as further input to produce results for the current input.

The drone flight model can be trained with supervised learning, where the training data includes environmental data and floorplan data as input and a desired output, such as flight control instructions. A representation of sample flight control instructions can be provided to the model. Output from the model can be compared to the desired output for that of the flight control instructions of a predicted route and based on the comparison, the model can be modified, such as by changing weights between nodes of the neural network or parameters of the functions used at each node in the neural network (e.g., applying a loss function). After applying each of the inputs from supervised learning in the training data and modifying the model in this manner, the model can be trained to evaluate new flight control instructions.

The drone flight model can be regularly updated and trained using new data sources to determine more accurate flight control instructions. In one example, the system 300a can input subscriber data such as subscriber location data or network traffic data to train the drone flight model to determine more precise floor plans or hazard locations, which allows the system to receive more accurate predicted routes and alternate routes as an output. In another example, the system 300a may also input signal strength data captured from the 5G-connected drone 314a and the user-controlled device to train the drone flight model. The 5G-connected drone 314a measures the signal strength received from the nearby 5G towers as the 5G-connected drone 314a navigates along the alternate route. The measured signal strength is charted over time to give a signal strength value as the 5G-connected drone 314a navigates the alternate route. A second signal strength value is calculated as the user-controlled device navigates along the alternate route. The second measured signal strength is charted over time to give a signal strength value as the user-controlled device navigates the alternate route. The system inputs the 5G-connected drone 314a signal strength chart and the user-controlled device signal strength chart into the drone flight model. The drone flight model compares the chart of the 5G-connected drone 314a to the chart of the user-controlled device. By knowing where the signal strength charts do not align, the drone flight model can determine where the alternate route taken by the 5G-connected drone 314a differs from the actual route taken by the user-controlled device. This information can be used to train the drone flight model. Regularly updating the drone flight model can allow for the system 300*a* to more accurately determine the flight control instructions.

The flight control instructions are the instructions needed to navigate the 5G-connected drone along a predicted route. The predicted route includes an interior of the single-family home 302*a*. The single-family home 302*a* is a single residence and contains hazards typical of a home, such as furniture, pets, or people. The system can consider the hazards and obstacles typical of the single-family home 302*a* when determining the flight control instructions. Once the system 300*a* has determined flight control instructions that correspond to the predicted route, the system sends the flight control instructions over the 5G network 304*a* to the 5G-connected drone 314*a*. The 5G-connected drone 314*a* then acts upon the flight control instructions to navigate the predicted flight route. As the 5G-connected drone 314*a* navigates the predicted route, it may encounter unique hazards, such as an injured person or harmful toxins in the air. The 5G-connected drone 314*a* calls for emergency assistance 310*a* to help prevent further harm from occurring before continuing its route.

Figure 3B:
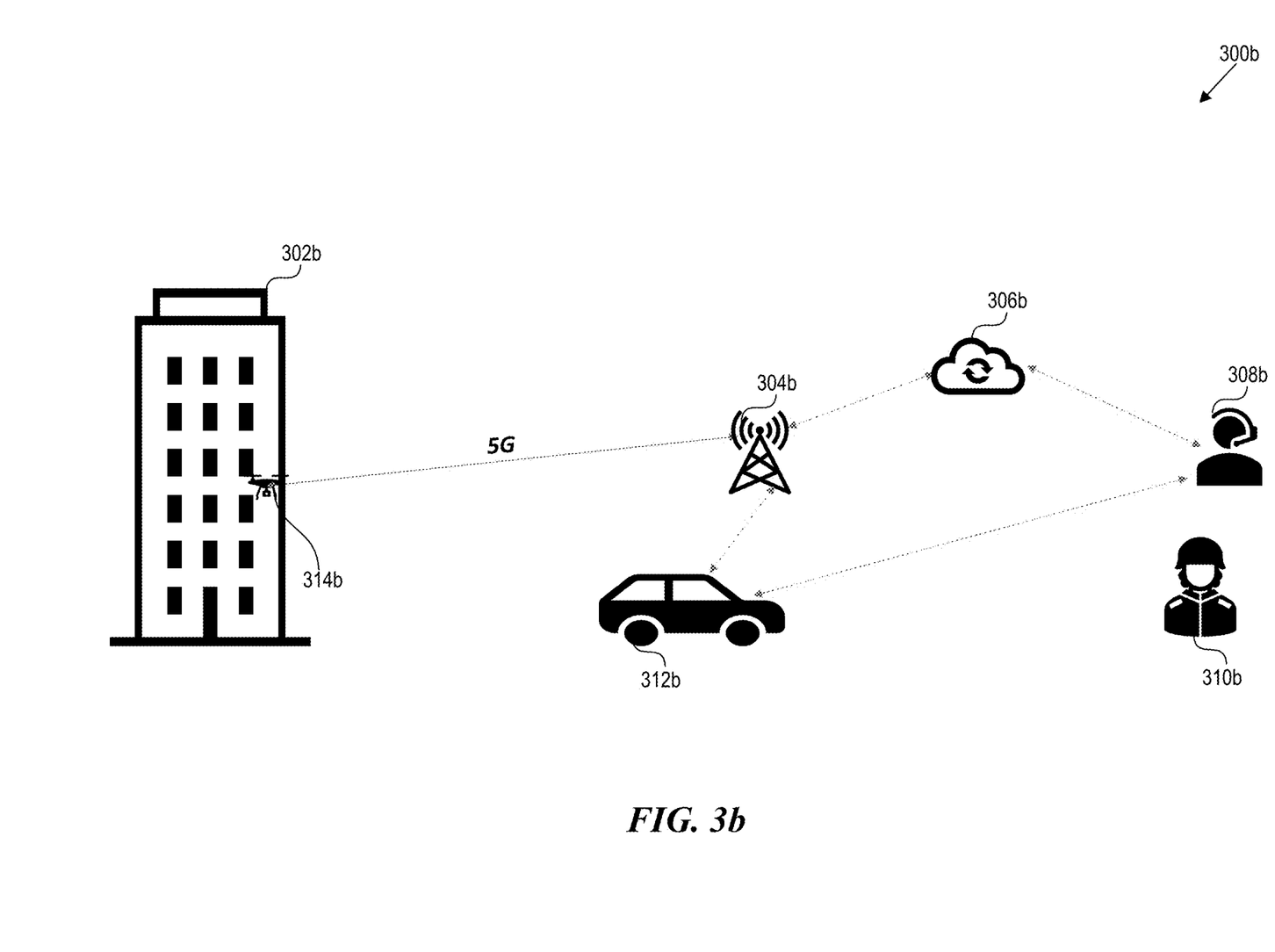

FIG. 3*b* is a block diagram that illustrates an example use case of the disclosed technology in which the system is operated inside and around a multi-unit building 302*b*. The 5G-connected drone 314*b* arrives at the location via a vehicle 312*b*. The 5G-connected drone 314*b* is a small unmanned aerial system capable of carrying a payload. The vehicle 312*b* is any vehicle or mode of transport that can transport the 5G-connected drone 314*b* to the required location. Once the 5G-connected drone 314*b* arrives at the desired location, it connects to a 5G network 304*b*. This allows the drone to connect to the cloud 306*b*, through which it can then receive flight control instructions. In one example, the system 300*b* sends the alternate route to a remote pilot 308*b*. The remote pilot 308*b* determines the needed flight control instructions and transmits them via the cloud 306*b* and 5G network 304*b* to the system 300*b*. The system 300*b* receives the flight control instructions and sends the flight control instructions to the 5G-connected drone 314*b* over the 5G network 304*b*. The system then causes the 5G-connected drone 314*b* to fly in accordance with the sequence of flight control instructions. In another example, the flight control instructions are generated automatically using a machine learning model as described in FIG. 3*a*, which also regularly updates the flight control instructions to ensure the 5G-connected drone flies properly.

The flight control instructions are the instructions needed to navigate the 5G-connected drone along a predicted route. The predicted route includes an interior of the multi-unit building 302*b*. The multi-unit building 302*b* is a large building such as an apartment building, office complex, or hospital. The multi-unit building 302*b* contains items and furniture typical of the type of multi-unit building 302*b* the 5G-connected drone 314*b* is navigating. For example, if the multi-unit building 302*b* is a hospital, it would contain medical equipment and hospital-specific furniture. The system can consider the hazards and obstacles typical of the type of multi-unit building 302*b* the 5G-connected drone 314*b* is navigating when determining the flight control instructions. The multi-unit building 302*b* differs from the single-family home 302*a* in that there are multiple stories and a greater number of different routes to get to each section of the multi-unit building 302*b*. Once the system 300*b* has determined flight control instructions that correspond to the predicted route, the system sends the flight control instructions over the 5G network 304*b* to the 5G-connected drone 314*b*. The 5G-connected drone 314*b* then acts upon the flight control instructions to navigate the predicted flight route. As the 5G-connected drone 314*b* navigates the predicted route, it may encounter unique hazards, such as an injured person or harmful toxins in the air. The 5G-connected drone 314*b* then calls for emergency assistance 310*b* to help prevent further harm from occurring before continuing its route.

Figure 3C:
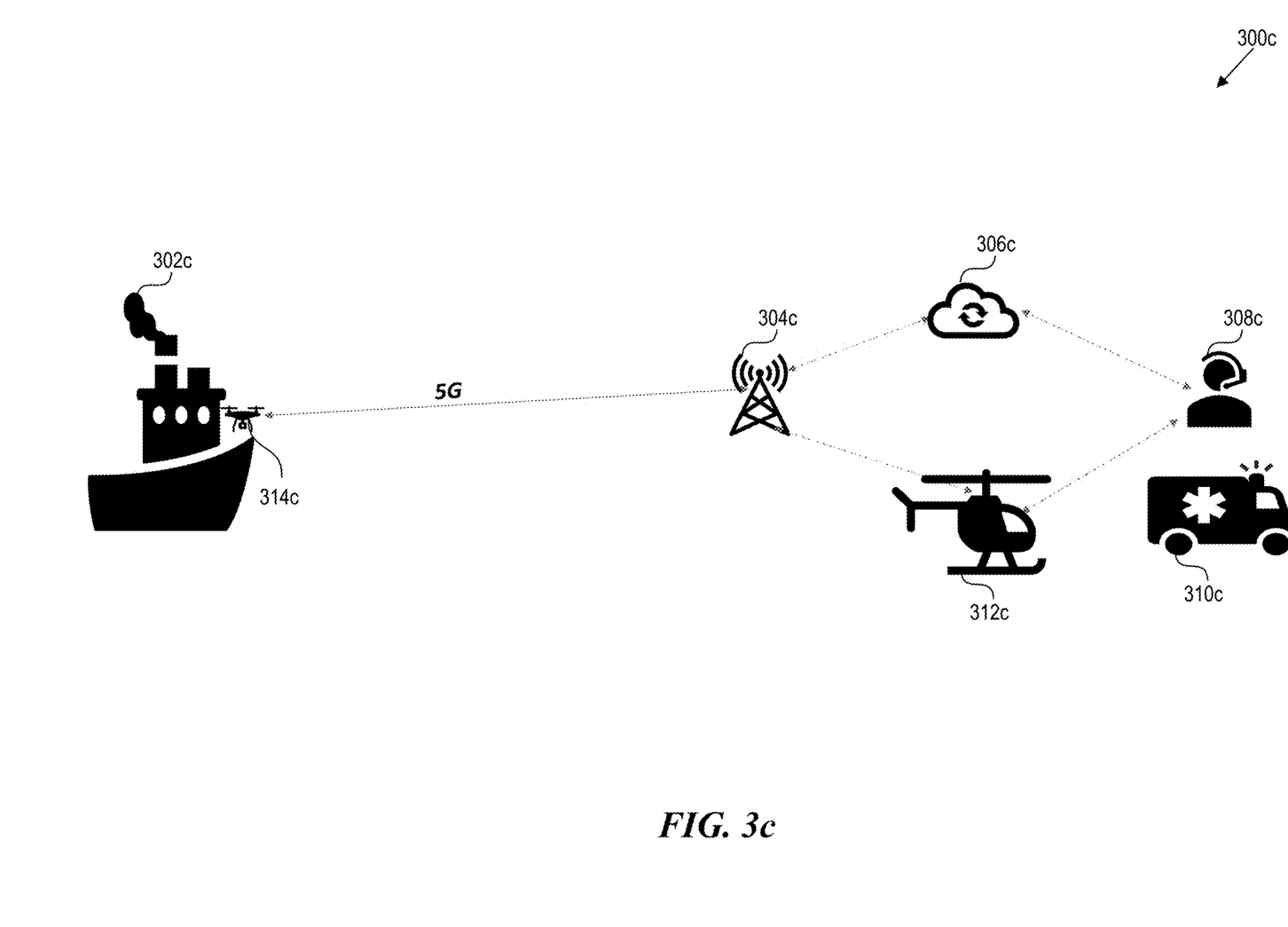

FIG. 3*c* is a block diagram that illustrates an example use case of the disclosed technology in which the system is operated inside of and around a moving structure 302*c*. The 5G-connected drone 314*c* arrives at the location via a vehicle 312*c*. The 5G-connected drone 314*c* is a small unmanned aerial system. The vehicle 312*c* is any vehicle or mode of transport that can transport the 5G-connected drone 314*c* to the required location, such as a helicopter. Once the 5G-connected drone 314*c* arrives at the desired location, it connects to a 5G network 304*c*. This allows the drone to connect to the cloud 306*c*, through which it can then receive flight control instructions. In one example, the system 300*c* sends the alternate route to a remote pilot 308*c*. The remote pilot 308*c* determines the needed flight control instructions and transmits them via the cloud 306*c* and 5G network 304*c* to the system 300*c*. The system 300*c* receives the flight control instructions and sends the flight control instructions to the 5G-connected drone 314*c* over the 5G network 304*c*. The system then causes the 5G-connected drone 314*c* to fly in accordance with the sequence of flight control instructions. In another example, the flight control instructions are generated automatically using a machine learning model as described in FIG. 3*a*, which also regularly updates the flight control instructions to ensure the 5G-connected drone flies properly.

The flight control instructions are the instructions needed to navigate the 5G-connected drone along a predicted route. The predicted route includes an interior of the moving structure 302*c*. The moving structure 302*c* is a building that is capable of changing location, such as a ship, plane, or houseboat. For example, the moving structure 302*c* can be located in remote areas where no Wi-Fi network exists, but a 5G network exists. The moving structure 302*c* can also be blocked by other structures preventing point-to-point links from acquiring a strong enough signal meaning and not functioning properly. This moving structure 302*c* can then be located in any location with a 5G signal. The moving structure 302*c* contains items and furniture typical of the type of moving structure 302*c* the 5G-connected drone 314*c* is navigating. The system can consider the hazards and obstacles typical of the type of moving structure 302*c* it is navigating when determining the flight control instructions. Additionally, the system 300*c* can take into account the movement of the moving structure 302*c* when determining the flight control instructions for the 5G-connected drone 314*c*. Once the system 300*c* has determined flight control instructions that correspond to the predicted route, the system sends the flight control instructions over the 5G network 304*c* to the 5G-connected drone 314*c*. The 5G-connected drone 314*c* then acts upon the flight control instructions in order to navigate the predicted flight route. As the 5G-connected drone 314*c* navigates the predicted route, it may encounter unique hazards, such as an injured person or harmful toxins in the air. The 5G-connected drone 314*c* then calls for emergency assistance 310*c* to help prevent further harm from occurring before continuing its route.

Figure 4:
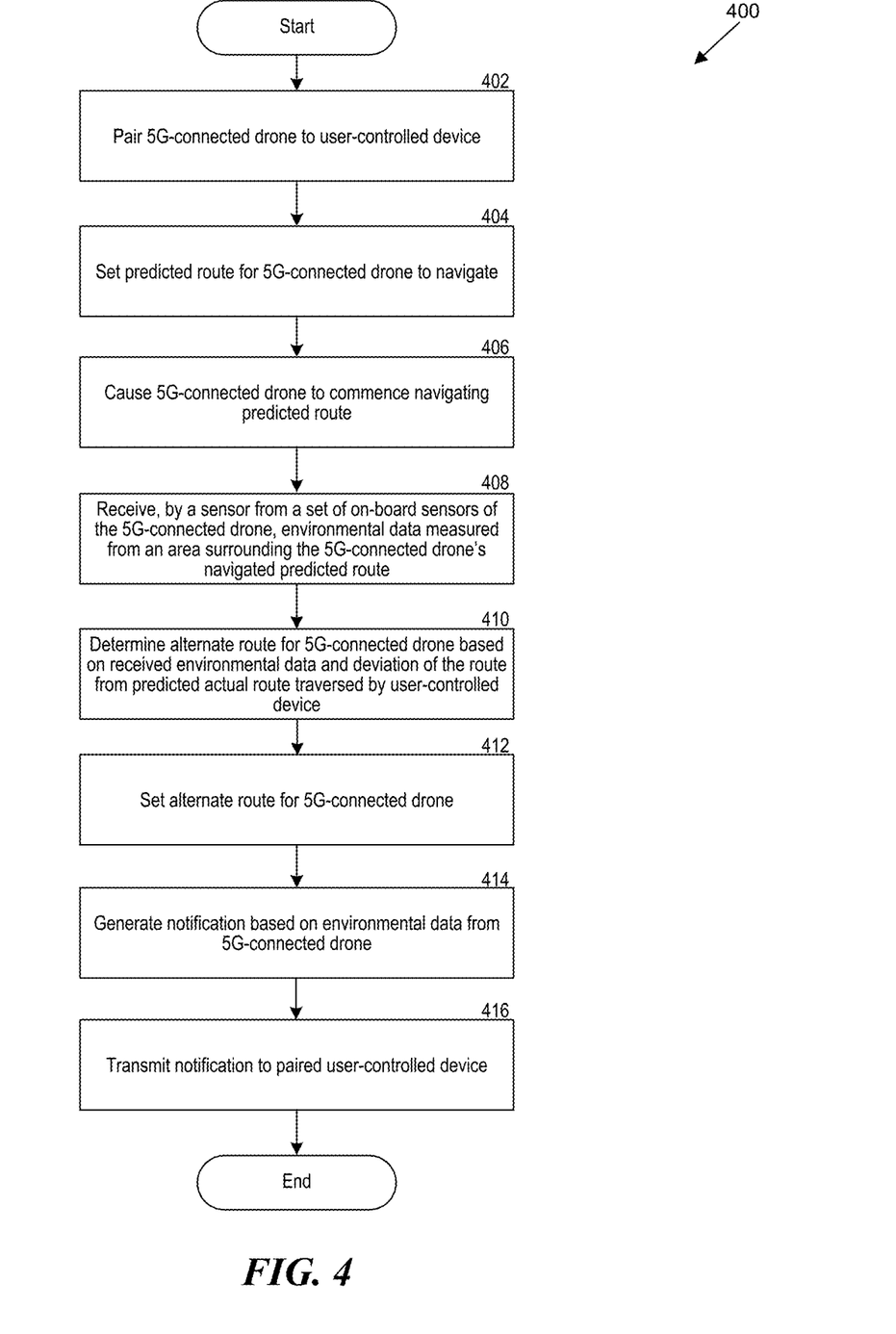
FIG. 4 is a flowchart that illustrates a process for navigating a 5G-connected drone and dynamically altering the route when a hazard is encountered.

FIG. 4 is a flowchart that illustrates a process 400 for dynamically navigating a drone on a predicted route to anticipate hazards for a user expected to travel the predicted route. The process can be performed by a system of a telecommunications network. In one example, the system includes at least one hardware processor and at least one non-transitory memory-storing instructions, which, when executed by the at least one hardware processor, cause the system to perform the process 400.

At 402, the system can pair a 5G-connected drone to a user-controlled device. At 404, the system can set a predicted route for the 5G-connected drone to navigate. In one example, at least a portion of the predicted route is configured to match an actual route of the user-controlled device. The predicted route is at least partially or entirely indoors. In another example, the predicted route is outdoors or at least partially outdoors. In another example, the predicted route is based on a floor plan, a history of location data from the user-controlled device, and/or an input on the user-controlled device.

At 406, the system can cause the 5G-connected drone to commence navigating the predicted route. At 408, the system can receive, by a sensor from a set of onboard sensors of the 5G-connected drone, environmental data measured from an area surrounding the 5G-connected drone's navigated predicted route.

At 410, the system can determine an alternate route for the 5G-connected drone based on the received environmental data and a deviation of the route from the predicted actual route traversed by the user-controlled device. In one example, the system can determine a severity of a detected hazard. The detected hazard can include a detected physical object. The system can categorize the detected hazard into a particular category of multiple categories, which are separated by types and severities of the detected hazards. The alternate route can be determined based on the severity and type of the detected hazard. In another example, the system can optimize the alternate route to reduce greenhouse gas emissions by lowering the energy utilization of the 5G-connected drone.

In another example, the system can monitor an air quality level of the alternate route once the 5G-connected drone enters the indoors. The air quality level is monitored for an amount of greenhouse gases. The system can compare the monitored air quality to a safe air quality level and can determine a second alternate route for the 5G-connected drone. The need for the second alternate route is based on the comparison between the monitored air quality level and the safe air quality level. The second alternate route does not contain unsafe air quality levels. The system can set the second alternate route for the 5G-connected drone. The system can generate a second notification indicating an unsafe air quality level and can transmit the notification to the paired user-controlled device over a 5G network.

At 412, the system can set the alternate route for the 5G-connected drone. In one example, the 5G-connected drone is configured to carry a payload. The system can detect the payload carried by the 5G-connected drone and receive a drop-off location for the payload. The system can determine a new alternate route for the 5G-connected drone based on the drop-off location that contains a detour to the drop-off location of the payload. The system can set the new alternate route for the 5G-connected drone.

In one example, the 5G-connected drone is configured to be flown by a remote pilot. As such, the system can send the alternate route to the remote pilot over the 5G network. The system receives a sequence of flight control instructions from the remote pilot and sends the sequence of flight control instructions to the 5G-connected drone over the 5G network. The system can cause the 5G-connected drone to fly in accordance with the sequence of flight control instructions. In another example, the 5G-connected drone is configured to be flown autonomously. As such, the system can determine a sequence of flight controls based on the alternate route and the received environmental data. The system can send the sequence of flight control instructions to the 5G-connected drone over the 5G network and can cause the 5G-connected drone to fly in accordance with the sequence of flight control instructions.

At 414, the system can generate a notification based on the environmental data from the 5G-connected drone. In one example, the notification is indicative of a hazard along the alternate route that is expected to be present on the actual route to be taken by the user-controlled device. In another example, the system can transmit the environmental data regularly to the user-controlled device. The environmental data can include sound, visual, temperature, and/or air quality data. The environmental data can be gathered using sensors on the 5G-connected drone, such as a microphone, a camera, a thermal sensor, and/or an air sensor. At 416, the system can transmit the notification to the paired user-controlled device over a 5G network. In one example, the system notifies the user-controlled device that a hazard along the alternate route is expected to be present on the actual path to be taken by the user-controlled device.

Computer System

Figure 5:
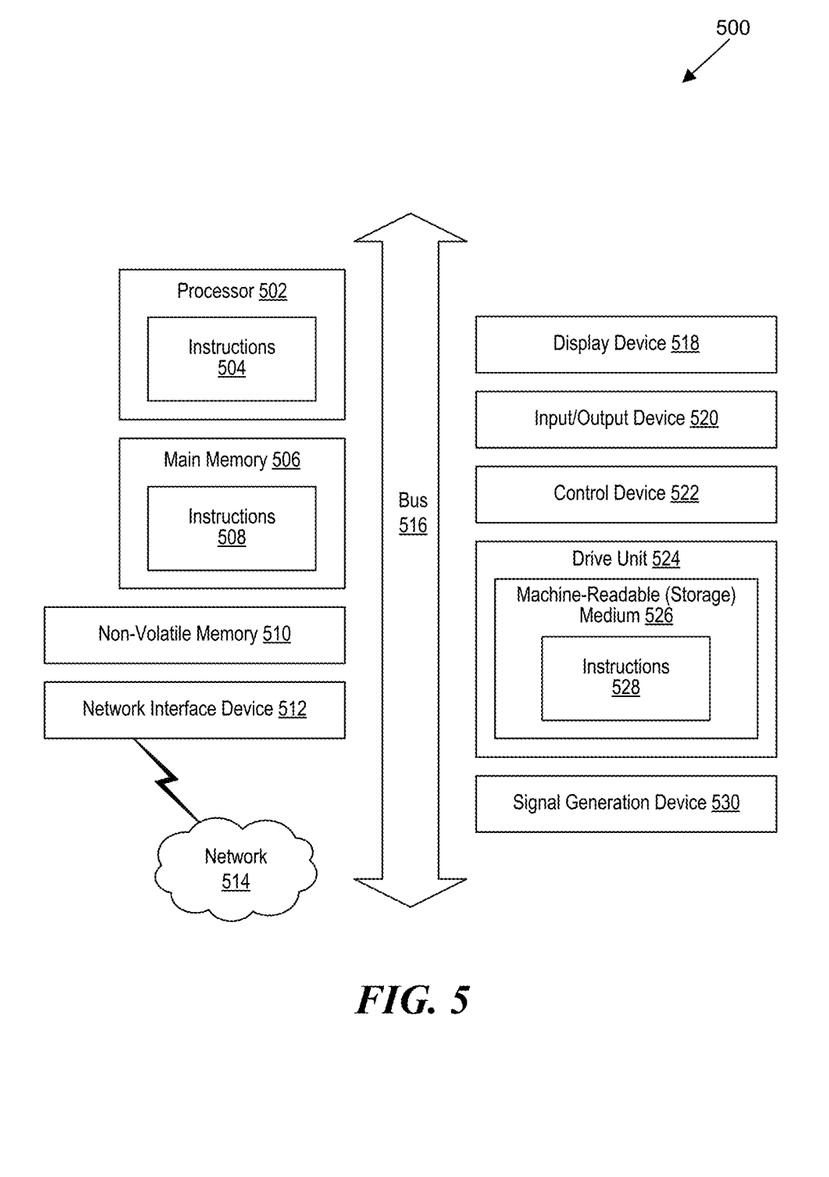
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A system comprising:
   at least one hardware processor; and
   at least one non-transitory memory storing instructions, which, when executed by the
   at least one hardware processor, cause the system to:
     pair a 5G-connected drone to a user-controlled device;
     set a predicted route for the 5G-connected drone to navigate,
       wherein at least a portion of the predicted route is configured to match an actual route of the user-controlled device, and
       wherein the predicted route is at least partially indoors;
     cause the 5G-connected drone to commence navigating the predicted route;
     receive, by a sensor from a set of onboard sensors of the 5G-connected drone, environmental data measured from an area surrounding the 5G-connected drone's navigated predicted route;
     determine an alternate route for the 5G-connected drone based on the received environmental data and a deviation of the predicted route from the actual route traversed by the user-controlled device;
     adjust the alternate route to lower energy utilization of the 5G-connected drone,
       wherein lowering the energy utilization reduces an amount of greenhouse gases emissions;
     set the alternate route for the 5G-connected drone;
     generate a notification based on the environmental data from the 5G-connected drone,
       wherein the notification is indicative of a hazard along the alternate route that is expected to be present on the actual route to be taken by the user-controlled device; and
     transmit the notification to the paired user-controlled device over a 5G network.

2. The system of claim 1 further caused to:
   transmit the environmental data regularly to the user-controlled device,
     wherein the environmental data includes sound, visual, temperature, or air quality data, and
     wherein the 5G-connected drone includes a microphone, camera, thermal sensor, or air sensor.

3. The system of claim 1, wherein the 5G-connected drone is configured to be flown by a remote pilot, the instructions further cause the system to:
   send the alternate route to the remote pilot over the 5G network;
   receive a sequence of flight control instructions from the remote pilot;
   send the sequence of flight control instructions to the 5G-connected drone over the 5G network; and
   cause the 5G-connected drone to fly in accordance with the sequence of flight control instructions.

4. The system of claim 1, wherein the 5G-connected drone is configured to be flown autonomously, the instructions further cause the system to:
   determine a sequence of flight controls,
     wherein the sequence of flight controls are based on the alternate route and the received environmental data;
   send the sequence of flight control instructions to the 5G-connected drone over the 5G network; and
   cause the 5G-connected drone to fly in accordance with the sequence of flight control instructions.

5. The system of claim 1, the instructions further cause the system to:
   monitor an air quality level of the alternate route once the 5G-connected drone enters the indoors,
     wherein the air quality level is monitored for an amount of greenhouse gases;
   compare the monitored air quality to a safe air quality level;
   determine a second alternate route for the 5G-connected drone,
     wherein the need for the second alternate route is based on the comparison between the monitored air quality level and the safe air quality level, and
     wherein the second alternate route does not contain unsafe air quality levels;
   set the second alternate route for the 5G-connected drone;
   generate a second notification indicating an unsafe air quality level; and
   transmit the notification to the paired user-controlled device over a 5G network.

6. The system of claim 1, wherein the predicted route is based on:
   a floor plan,
   a history of location data from the user-controlled device, or
   an input on the user-controlled device.

7. The system of claim 1, wherein the 5G-connected drone carries a payload, the instructions further cause the system to:
   detect the payload carried by the 5G-connected drone;
   receive a drop-off location for the payload;
   determine a new alternate route for the 5G-connected drone based on the drop-off location,
     wherein the new alternate route contains a detour to the drop-off location of the payload; and
   set the new alternate route for the 5G-connected drone.

8. The system of claim 1, the instructions further cause the system to:
   determine a severity of a detected hazard,
     wherein the detected hazard includes a detected physical object; and
   categorize the detected hazard in a particular category of multiple categories,
     wherein the multiple categories are separated by types and severities of the detected hazards, and
     wherein the alternate route is determined based on the severity and type of the detected hazard.

9. A non-transitory, computer-readable storage medium comprising instructions recorded thereon, wherein the instructions when executed by at least one data processor of a system, cause the system to:

set a predicted route for a 5G-connected drone to navigate,
  wherein at least a portion of the predicted route is configured to match an actual route of a user-controlled device, and
  wherein the predicted route is at least partially indoors;
cause the 5G-connected drone to commence navigating the predicted route;
receive, by a sensor from a set of onboard sensors of the 5G-connected drone, environmental data measured from an area surrounding the 5G-connected drone's navigated predicted route;
determine that an alternate route for the 5G-connected drone exists based on the received environmental data and a deviation of the predicted route from the actual route traversed by the user-controlled device;
adjust the alternate route to lower energy utilization of the 5G-connected drone,
  wherein lowering the energy utilization reduces an amount of greenhouse gases; and
set the alternate route for the 5G-connected drone.

10. The non-transitory, computer-readable storage medium of claim 9, wherein the instructions cause the system to:
transmit the environmental data regularly to the user-controlled device,
  wherein the environmental data includes sound, visual, temperature, or air quality data, and
  wherein the 5G-connected drone includes a microphone, camera, thermal sensor, or air sensor.

11. The non-transitory, computer-readable storage medium of claim 9, wherein the instructions cause the system to:
generate a notification based on the environmental data from the 5G-connected drone,
  wherein the notification is indicative of a hazard along the alternate route that is expected to be present on the actual route to be taken by the user-controlled device; and
transmit the notification to the user-controlled device over a 5G network.

12. The non-transitory, computer-readable storage medium of claim 9, wherein the instructions cause the system to:
determine a severity of a detected hazard,
  wherein the detected hazard includes a detected physical object; and
categorize the detected hazard in a particular category of multiple categories,
  wherein the multiple categories are separated by types and severities of the detected hazards, and
  wherein the alternate route is determined based on the severity and type of the detected hazard.

13. The non-transitory, computer-readable storage medium of claim 9, wherein the 5G-connected drone is configured to be flown by a remote pilot, the instructions further cause the system to:
send the alternate route to the remote pilot over a 5G network;
receive a sequence of flight control instructions from the remote pilot;
send the sequence of flight control instructions to the 5G-connected drone over the 5G network; and
cause the 5G-connected drone to fly in accordance with the sequence of flight control instructions.

14. The non-transitory, computer-readable storage medium of claim 9, wherein the 5G-connected drone is configured to be flown autonomously, the instructions further cause the system to:
determine a sequence of flight controls,
  wherein the sequence of flight controls are based on the alternate route and the received environmental data;
send the sequence of flight control instructions to the 5G-connected drone over a 5G network; and
cause the 5G-connected drone to fly in accordance with the sequence of flight control instructions.

15. A 5G-connected drone caused to:
pair to a user-controlled device over a 5G network;
set a predicted route to navigate,
  wherein at least a portion of the predicted route is configured to match an actual route of the user-controlled device, and
  wherein the predicted route is at least partially indoors;
commence navigating the predicted route;
receive, by a sensor from a set of onboard sensors, environmental data measured from an area surrounding the 5G-connected drone's navigated predicted route;
determine an alternate route based on the received environmental data and a deviation of the predicted route from the actual route traversed by the user-controlled device;
adjust the alternate route to lower energy utilization,
  wherein lowering the energy utilization reduces an amount of greenhouse gases emissions; and
set the alternate route.

16. The 5G-connected drone of claim 15 further caused to:
transmit the environmental data regularly to the user-controlled device,
  wherein the environmental data includes sound, visual, temperature, or air quality data, and
  wherein the 5G-connected drone includes a microphone, camera, thermal sensor, or air sensor.

17. The 5G-connected drone of claim 15, wherein the 5G-connected drone is configured to be flown by a remote pilot, further caused to:
send the alternate route to the remote pilot over the 5G network;
receive a sequence of flight control instructions from the remote pilot; and
fly in accordance with the sequence of flight control instructions.

18. The 5G-connected drone of claim 15, wherein the 5G-connected drone is configured to be flown autonomously, further caused to:
determine a sequence of flight controls,
  wherein the sequence of flight controls are based on the alternate route and the received environmental data; and
fly in accordance with the sequence of flight control.

19. The 5G-connected drone of claim 15, further caused to:
monitor an air quality level of the alternate route once the 5G-connected drone enters the indoors,
  wherein the air quality level is monitored for an amount of greenhouse gases;
compare the monitored air quality to a safe air quality level;
determine a second alternate route,
  wherein the need for the second alternate route is based on the comparison between the monitored air quality level and the safe air quality level, and wherein the second alternate route does not contain unsafe air quality levels;
set the second alternate route;
generate a second notification indicating an unsafe air quality level; and
transmit the notification to the paired user-controlled device over a 5G network.

20. The 5G-connected drone of claim 15, further caused to:
determine a severity of a detected hazard,
    wherein the detected hazard includes a detected physical object; and
categorize the detected hazard in a particular category of multiple categories,
    wherein the multiple categories are separated by types and severities of the detected hazards, and
    wherein the alternate route is determined based on the severity and type of the detected hazard.

* * * * *